United States Patent [19]

Aoki

[11] Patent Number: 4,724,116
[45] Date of Patent: Feb. 9, 1988

[54] INJECTION BLOW MOLDING METHOD

[76] Inventor: Katashi Aoki, 6037 Ohaza Minamijo, Sakaki-machi, Hanishina-gun, Nagano-ken, Japan

[21] Appl. No.: 480,776

[22] Filed: Apr. 1, 1983

Related U.S. Application Data

[63] Continuation of Ser. No. 290,575, Aug. 6, 1981, abandoned, which is a continuation of Ser. No. 79,299, Sep. 26, 1979, abandoned.

[30] Foreign Application Priority Data

Sep. 28, 1978 [JP] Japan ............................ 53-119538

[51] Int. Cl.⁴ ............................................ B29C 49/06
[52] U.S. Cl. .................................... 264/537; 264/520
[58] Field of Search ............... 264/520, 521, 537, 538, 264/541; 425/533

[56] References Cited

U.S. PATENT DOCUMENTS

| | | | |
|---|---|---|---|
| 2,750,625 | 6/1956 | Colombo | 425/539 X |
| 2,789,312 | 4/1957 | Borer | 425/526 |
| 2,792,593 | 5/1957 | Hardgrove, Jr. | 425/526 X |
| 3,137,748 | 6/1964 | Makowski | 264/537 |
| 3,294,883 | 12/1966 | Polka | 264/537 X |

Primary Examiner—Jan H. Silbaugh
Assistant Examiner—Hubert C. Lorin
Attorney, Agent, or Firm—Christie, Parker & Hale

[57] ABSTRACT

In the process to form a plastic flat bottle by blowing air into an injection molded parison having a bottom, the injection blow molding method of the invention is characterized in that the thicknesses of the portions of the parison to form the front and rear faces of the flat bottle are made larger than the thicknesses of the portions of the parison to form the side end faces of the flat bottle, thereby enlarging the heat capacity in the former portions of the parison to form the front and rear faces than that of the portions of the parison to form the side end faces of the flat bottle so as to make the former portions of the parison to be expanded more easily.

4 Claims, 7 Drawing Figures

INJECTION BLOW MOLDING METHOD

This application is a continuation of Ser. No. 290,575, filed Aug. 6, 1981, now abandoned which is a continuation of Ser. No. 79,299, filed Sept. 26, 1979, now abandoned.

BACKGROUND OF THE INVENTION

(1) Field of the Invention

This invention relates to an injection blow molding method for producing plastic flat bottles and the like. More particularly, the invention relates to an improved injection blow molding method in which injection molded cylindrical parisons are blown with air to produce flat bottles which are commonly used as the receptacles for toiletries, detergents and oils.

(2) Description of the Prior Art

It has been easily and commonly practised to produce cross-sectionally circular bottles by inflating injection molded cylindrical parisons having bottoms (hereinafter referred to as simply "parisons") with blowing air into them.

Further, when the cross-sectionally circular bottles are molded from the cylindrical parisons, the wall thicknesses of the bottles become even because the ratio of expansion is constant if the thickness and temperature distribution of the parison is even and there occurs no difference in the expansion of each portion of the parison during the blowing.

Meanwhile, when the bottle having a cross-section in the shape of an ellipse or a rounded rectangle (hereinafter referred to as "flat bottle") is produced from the cylindrical parison, the distribution of wall thickness becomes irregular and the uneven thickness is caused to occur because the ratio of expansion is uneven.

When the bottle of thick wall is molded, this unevenness in wall thickness is not so notable and there occurs no serious problem in view of the wall thickness. However, when a bottle of 0.2 to 0.5 mm in wall thickness is produced in which the parison is expanded in both the directions of its axis and circumference, the unevenness in wall thickness becomes serious. In an extreme case, both side end portions become very thin like a film so that the molded product losses its utility as a bottle.

Since the cause of such uneven thickness is attributable to the deformation of the cross-section of the parison from a circle into an ellipse, as the measure to avoid the uneven thickness, it will be considered that the problem may be solved by forming the parison in accordance with the shape of the final product. In the injection molding, however, the neck portion is integrally formed, which is different from the extrusion molding, therefore, it is impossible to form such differently shaped parison due to the structure of the mold.

BRIEF SUMMARY OF THE INVENTION

It is, therefore, the primary object of the present invention to provide an improved injection blow molding method for producing plastic flat bottles which is free from the above-mentioned disadvantages in the conventional art.

Another object of the present invention is to provide an improved injection blow molding method for producing flat bottles in which method the thickness of the parison is varied without changing the external cylindrical shape and expand the parison into a bottle having the wall of even thickness, thereby forming various kinds of flat bottles under the same process as that for the production of cylindrical bottles.

A further object of the present invention is to provide an injection blow molding method for producing flat bottles in which method not only the bottle having even wall thickness but also the strengthened bottle having rather larger wall thickness in both the side end portions of the bottle are produced, while in the conventional art, both the side end portions are liable to become thin when an evenly thick parison is expanded.

In accordance with the present invention as described above, when a flat bottle is molded by blowing air into a parison that is made by injection molding, the thicknesses of the portions of a parison to form the front and rear faces of the flat bottle are made larger than the thicknesses of the portions of the parison to form both the side end portions of the flat bottle, tereby enlarging the heat capacity in the above portions of the parison to form the front and rear faces than that of the portions of the parison to form the side end portions so as to make the former portions of the parison to be expanded more easily.

BRIEF DESCRIPTION OF THE DRAWINGS

These and other objects and features of the present invention will be described in more detail with reference to the accompanying drawings, in which.

DESCRIPTION OF PREFERRED EMBODIMENTS

Figure 1:
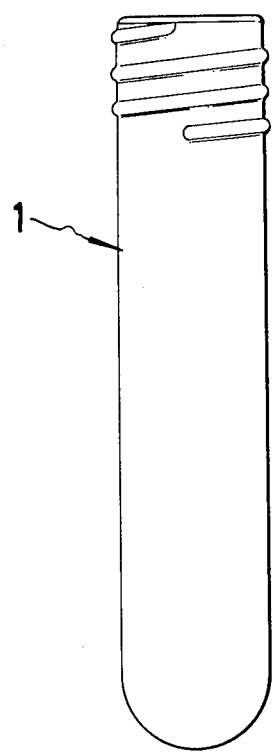
FIG. 1 is a front view of the embodiment of a parison which is used for the method of the present invention.

In the drawings, the reference numeral 1 denotes a cylindrical parison having a bottom and the reference numeral 2 denotes a flat bottle having an ellipse plan section.

Figure 2:
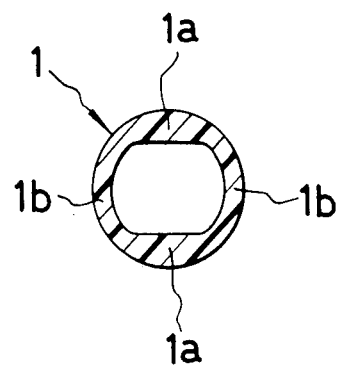
FIG. 2 is a horizontal cross-sectional view of the same embodiment, in which the distribution of wall thickness the parison is dictated.
Figure 3:
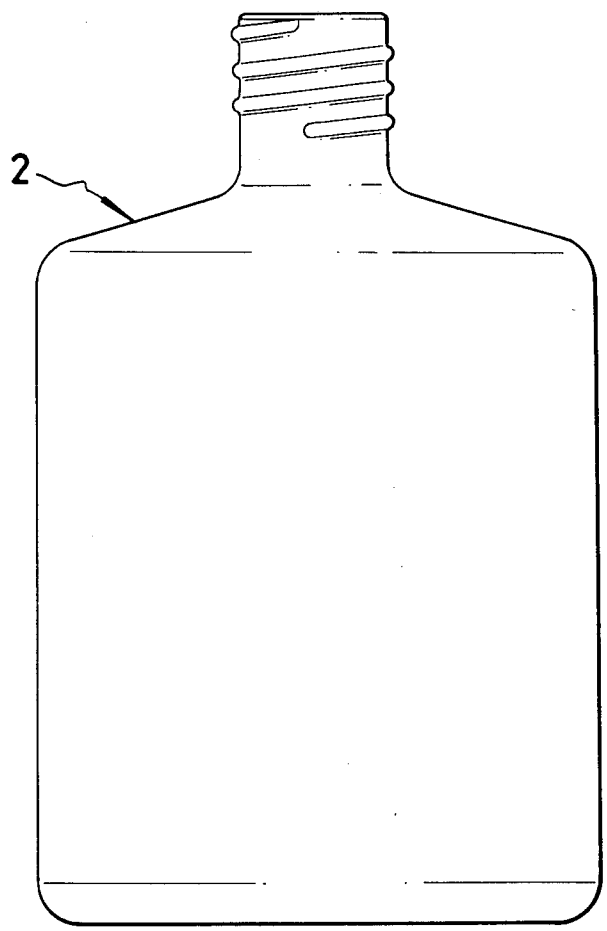
FIG. 3 is a front view of a flat bottle which is made from the parison shown in FIG. 1.
Figure 4:
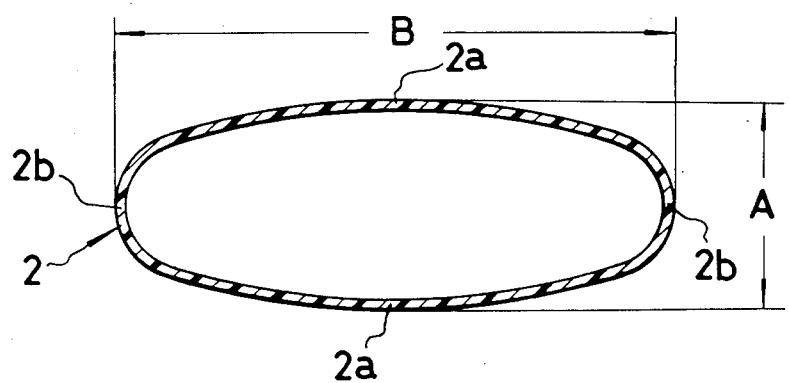
FIG. 4 is a horizontal cross-sectional view of the same flat bottle, in which the distribution of wall thickness of the bottle is shown.

As shown in FIG. 2, the thicknesses of the portions 1a of the parison 1 which form the front and rear faces 2a of the bottle 2 of FIG. 4 are made larger than the portions 1b of the parison 1 which form the side end faces 2b of the bottle 2. The difference between these thicknesses may be determined in accordance with the difference between the dimension A (between both the front and rear faces) and the dimension B (between both the side end faces) and the difference in thickness is made larger in proportion to the dimension B relative to the dimension A. This difference in thickness is generally about 0.1 to 0.5 mm.

The parison 1 is formed in an injection mold, and in one case, it is transferred into a blow mold together with the core, which is instantly followed by the blow molding into a flat bottle 2. In the other case, the parison 1 is led into an oven so as to regulate the temperature of the parison 1 to the level which is suitable for blow molding and the parison 1 is axially elongated within the blow mold, then air is blown into the parison 1 to form a flat bottle 2.

Figure 5:
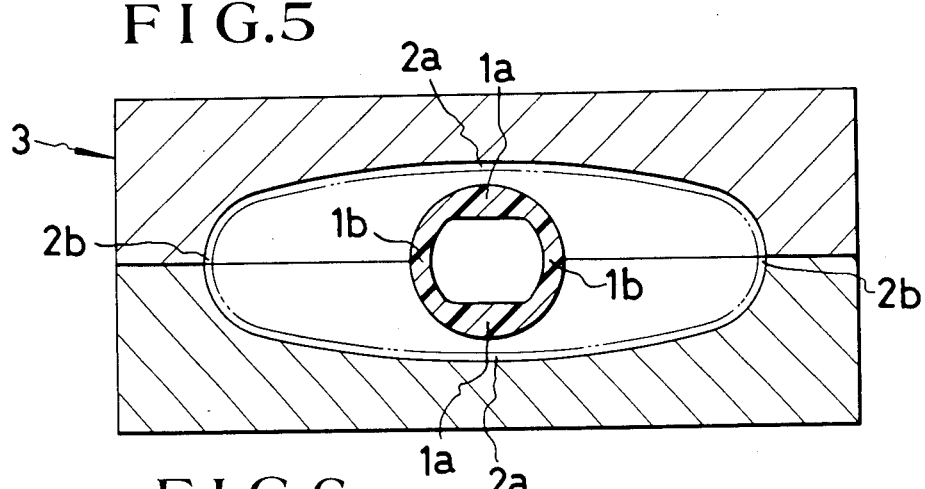
FIG. 5 is a horizontal cross-sectional view of the combination of a parison and a blow mold showing their locational relations.

As shown in FIG. 5, the parison 1 is so molded in the injection mold that the above-mentioned portions 1a is disposed opposite to the mold surfaces of the blow mold 3 which form the front and rear faces 2a of the bottle. Therefore, when air is blown into the parison 1, the portions 1a are expanded in the direction to form the front and rear faces 2a and the portions 1b, both the side end faces 2b.

When the parison 1 is expanded, if the distribution of thickness of the parison 1 is even and the heat capacity in each portion is the same to each other, the rate of expansion of each portion becomes identical. Therefore, in view of the distances, the portions 1a reach the mold surfaces earlier and they are rapidly cooled and become hard before the portions 1b reach the mold surfaces. Accordingly, only the portions 1b are further expanded until they reach the mold surfaces. As the result, the side faces 2b on both sides of the bottle 2 become thin.

Figure 6:
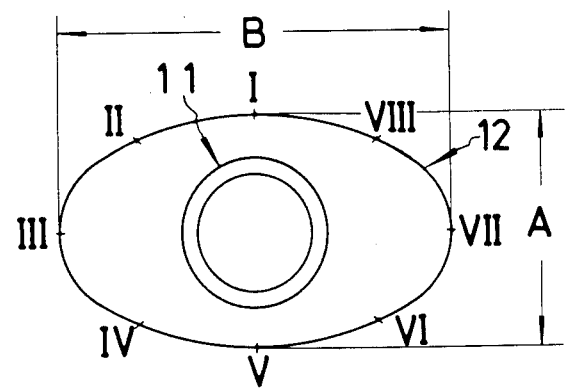
FIG. 6 is a schematic illustration showing the points of wall thickness measurement with regard to a flat bottle which is produced from a parison having even wall thickness.

FIG. 6 shows the results of the molding of a cross-sectionally ellipse bottle 12 from a parison 11. The dimension A of the bottle 12 was 37 mm and the dimension B was 65 mm. The thickness of the parison was 2.5 mm through and the inner diameter was 19 mm. The wall thicknesses (mm) of the obtained bottle 12 were measured by cutting the bottle into eight equal parts along the longitudinal directions, the results of which in the respective portions are shown in the following Table 1.

TABLE 1

| Section | I | II | III | IV | V | VI | VII | VIII |
|---|---|---|---|---|---|---|---|---|
| Thickness (mm) | 0.75 | 0.52 | 0.18 | 0.53 | 0.66 | 0.50 | 0.19 | 0.51 |

As will be understood from the above results, the thickness in the sections III and VII in both side portions of the bottle 12 are quite different from the thickness in the sections I and V in the front and rear middle portions of the bottle 12, therefore, the thickness distribution is uneven.

Meanwhile in the present invention in which the wall thickness of the parison is varied, the heat capacities in the wall portions of the parison are also varied. Therefore the thicker portions are easily extensible and difficulty cooled against the cooling by the mold surfaces, which causes the difference in the expansion of the parison 1 in the blow mold 3. Accordingly, the portions 1a having larger heat capacity are much extended as compared with the portions 1b which have smaller heat capacity and are easily cooled. Even when the portions 1a reach earlier the mold surfaces since they are nearer to the mold surfaces and are subjected to cooling, the portions 1a can be further extended. Therefore, it is not caused to occur that only the portions 1b are largely extended into thin walls, while the ratio of extension in the portions 1a becomes larger. Accordingly, the wall thickness of the flat bottle 2 becomes even throughout.

Figure 7:
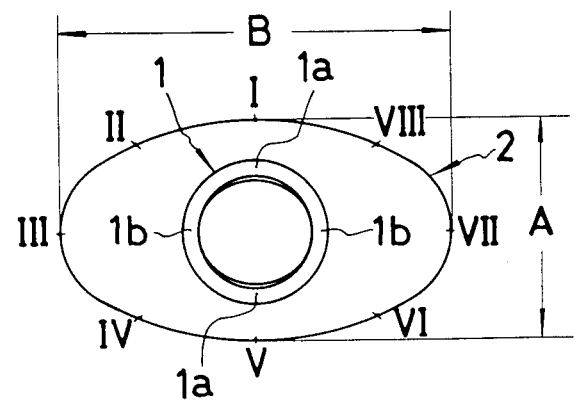
FIG. 7 is a schematic illustration showing the points of wall thickness measurement with regard to a flat bottle which is produced from a parison having uneven wall thickness.

FIG. 7 shows the results of the molding of a cross-sectionally ellipse bottle 2 from a parison 1 of 2.5 mm in thickness, in which the thicknesses of the portions 1a were made larger by about 0.2 mm than the thicknesses of the other portions 1b. The shape and the dimensions A and B were the same as those of the foregoing bottle 12. The measurement results of thicknesses (mm) in the eight equally divided sections are shown in the following Table 2.

TABLE 2

| Section | I | II | III | IV | V | VI | VII | VIII |
|---|---|---|---|---|---|---|---|---|
| Thickness (mm) | 0.35 | 0.35 | 0.34 | 0.34 | 0.36 | 0.35 | 0.33 | 0.34 |

According to these measurement values, it is understood that the differences in the thicknesses between both the side end portions III and VII and the front and rear middle portions I and V are 0.02–0.03 mm which are very small and the differences in the thicknesses throughout the side wall of the bottle come within such the range, therefore, the wall thickness of the bottle produced according to the method of the present invention can be made quite even.

Further, the difference in the wall thickness of the parison 1 was made 0.3 mm and the injection blow molding was carried out in like manner as the above. The thicknesses (mm) of the respective sections of the obtained flat bottle are shown in the following Table 3.

TABLE 3

| Section | I | II | III | IV | V | VI | VII | VIII |
|---|---|---|---|---|---|---|---|---|
| Thickness (mm) | 0.28 | 0.35 | 0.45 | 0.34 | 0.26 | 0.33 | 0.44 | 0.36 |

In this case, the thicknesses of both the side end portions III and VII of the flat bottle 2 are larger than those of the front and rear middle portions I and V. This fact shows that the strength of the side end portions of flat bottle 2 can be increased by varying the thickness of the parison.

As described above, in the method of the present invention, the thicknesses of the portions of a parison to form the front and rear side faces of a flat bottle is made different from the portions of the parison to form the side end faces of the bottle, that is, the portions of the parison to form the front and rear side faces are made thicker so as to increase the heat capacity, Therefore, the uniform expansion of the parison is made possible and, even when cylindrical parison are used, flat bottles of even thickness can be produced. Furthermore, since it is only necessary to vary the thickness distribution of the parison in the stage of injection molding, the process is not different from the blow molding of circular bottles and the flat bottles of any shapes can be mass-produced in like manner as the conventional molding process.

Although the present invention has been described in connection with preferred embodiments thereof, many variations and modifications will now become apparent to those skilled in the art. It is preferred, therefore, that the present invention be limited not by the specific disclosure herein but only by the appended claims.

What is claimed is:

1. A method for producing non-circular plastic bottles by injection blow molding in a non-circular mold having mold walls wherein opposing portions of said mold wall are closer to each other than other opposing portions of said mold walls, including the steps of:

injection molding a parison of uniform temperature, said parison having a circular outer contour, a bottom, and a said wall wherein opposing portions of the wall of the parison have a greater wall thickness than other opposing portions of the parison wall, said thicker wall portions having a greater capacity to store heat than said thinner wall portions;

positioning the parison in said blow mold so that upon expansion of the parison during blow molding, the opposing portions of the parison having greater wall thickness will contact the opposing portions of the blow mold wall closest to each other before the opposing portions of the parison having a lesser wall thickness contact the remainder of the blow mold walls; and blowing the parison so positioned into a finished bottle whereby, the thicker wall portions of the parison having more heat than the thinner wall portions will permit the remainder of the parison to extend into the remainder of the blow mold and contact the remainder of the blow mold walls to form a finished bottle having a relatively uniform wall thickness.

2. The method as claimed in claim 1 wherein said non-circular bottle is generally flat and has a cross-section generally in the shape of an ellipse.

3. The method as claimed in claim 1 wherein said non-circular bottle is generally flat and has a cross-section generally in the shape of a rectangle.

4. The method as claimed in claims 2 or 3, wherein the thickness of the opposing portions of said parison to form the front and rear faces of said generally flat bottle is made larger by about 0.1 to 0.5 mm than the thickness of the opposing portions of said parison to form the side end faces of said generally flat bottle.

* * * * *

UNITED STATES PATENT AND TRADEMARK OFFICE
CERTIFICATE OF CORRECTION

PATENT NO. : 4,724,116
DATED : February 9, 1988
INVENTOR(S) : K. Aoki et al

It is certified that error appears in the above-identified patent and that said Letters Patent is hereby corrected as shown below:

Column 1, line 6, change "79,299" to -- 79,229 --

Column 1, line 45, change "losses" to -- loses --

Column 2, line 17, change "tereby" to -- thereby --

Column 2, line 32, after "thickness" insert -- of --

Column 3, line 53, after "extensible and" insert --with--

Column 4, line 47, after "capacity" change the "," to -- . --

Signed and Sealed this

Thirteenth Day of September, 1988

Attest:

DONALD J. QUIGG

Attesting Officer         Commissioner of Patents and Trademarks